(12) United States Patent
Hotson et al.

(10) Patent No.: US 11,318,952 B2
(45) Date of Patent: May 3, 2022

(54) FEEDBACK FOR AN AUTONOMOUS VEHICLE

(71) Applicant: Ford Global Technologies, LLC, Dearborn, MI (US)

(72) Inventors: Guy Hotson, Dearborn, MI (US); Maryam Moosaei, Dearborn, MI (US); Vidya Nariyambut Murali, Dearborn, MI (US); Jinesh J. Jain, Dearborn, MI (US)

(73) Assignee: Ford GLobal Technologies, LLC, Dearborn, MI (US)

( * ) Notice: Subject to any disclaimer, the term of this patent is extended or adjusted under 35 U.S.C. 154(b) by 251 days.

(21) Appl. No.: 16/479,380

(22) PCT Filed: Jan. 24, 2017

(86) PCT No.: PCT/US2017/014769
§ 371 (c)(1),
(2) Date: Jul. 19, 2019

(87) PCT Pub. No.: WO2018/139993
PCT Pub. Date: Aug. 2, 2018

(65) Prior Publication Data
US 2019/0382030 A1 Dec. 19, 2019

(51) Int. Cl.
*B60W 50/02* (2012.01)
*B60W 30/18* (2012.01)
(Continued)

(52) U.S. Cl.
CPC ...... *B60W 50/02* (2013.01); *B60W 30/18145* (2013.01); *B60W 50/14* (2013.01); *G05B 13/027* (2013.01); *G05D 1/0088* (2013.01); *G06N 3/08* (2013.01); *B60W 2050/0062* (2013.01); *B60W 2050/146* (2013.01); *B60W 2420/42* (2013.01); *B60W 2420/52* (2013.01);
(Continued)

(58) Field of Classification Search
CPC .......... B60W 50/02; B60W 30/18145; B60W 50/14; B60W 2552/00; B60W 2554/00; B60W 2050/146; B60W 2420/42; B60W 2420/52; B60W 2050/0062; G05B 13/027; G05D 1/0088; G06N 3/08
See application file for complete search history.

(56) References Cited

U.S. PATENT DOCUMENTS 8,762,035 B2 * 6/2014 Levine .................. G01C 21/34
701/117
9,881,503 B1 * 1/2018 Goldman-Shenhar ......................
G05D 1/0088

(Continued)

*Primary Examiner* — Hunter B Lonsberry
*Assistant Examiner* — Jay Khandpur
(74) *Attorney, Agent, or Firm* — Brandon Hicks; Eversheds Sutherland (US) LLP

(57) ABSTRACT

A controller receives sensor data during a ride and provides it to a server system. A passenger further provides feedback concerning the ride in the form of some or all of an overall rating, flagging of ride anomalies, and flagging of road anomalies. The sensor data and feedback are input to a training algorithm, such as a deep reinforcement learning algorithm, which updates an artificial intelligence (AI) model. The updated model is then propagated to controllers of one or more autonomous vehicle which then perform autonomous navigation and collision avoidance using the updated AI model.

20 Claims, 4 Drawing Sheets

(51) Int. Cl.
   *B60W 50/14* (2020.01)
   *G05B 13/02* (2006.01)
   *G05D 1/00* (2006.01)
   *G06N 3/08* (2006.01)
   *B60W 50/00* (2006.01)

(52) U.S. Cl.
   CPC ..... *B60W 2552/00* (2020.02); *B60W 2554/00* (2020.02)

(56) References Cited

U.S. PATENT DOCUMENTS

| | | | |
|---|---|---|---|
| 9,884,630 B1* | 2/2018 | Ross | B60W 10/18 |
| 10,212,536 B2* | 2/2019 | Chheda | H04W 4/029 |
| 10,423,991 B1* | 9/2019 | Jeon | G08G 1/005 |
| 2010/0063648 A1* | 3/2010 | Anderson | G06N 5/043 |
| | | | 701/1 |
| 2010/0066527 A1* | 3/2010 | Liou | B60Q 9/008 |
| | | | 340/461 |
| 2015/0166062 A1* | 6/2015 | Johnson | B60W 10/20 |
| | | | 701/41 |
| 2016/0027306 A1* | 1/2016 | Lambert | G08G 1/123 |
| | | | 701/117 |
| 2016/0132728 A1* | 5/2016 | Choi | G06K 9/6215 |
| | | | 382/103 |
| 2017/0166221 A1* | 6/2017 | Osterman | B60W 50/14 |
| 2017/0203766 A1* | 7/2017 | Prokhorov | B60W 40/09 |
| 2018/0060827 A1* | 3/2018 | Abbas | G05D 1/0285 |
| 2018/0237018 A1* | 8/2018 | Goto | G01C 21/3658 |
| 2018/0360177 A1* | 12/2018 | Kovtun | G05D 1/028 |
| 2019/0047584 A1* | 2/2019 | Donnelly | G05D 1/0088 |
| 2019/0056231 A1* | 2/2019 | Bai | G01C 21/30 |

* cited by examiner

FEEDBACK FOR AN AUTONOMOUS VEHICLE

BACKGROUND

Field of the Invention

This invention relates to operating an autonomous vehicle.

Background of the Invention

Autonomous vehicles are becoming much more relevant and utilized on a day-to-day basis. In an autonomous vehicle, a controller relies on sensors to detect surrounding obstacles and road surfaces. The controller implements logic that enables the control of steering, braking, and accelerating to reach a destination and avoid collisions.

The system and method disclosed herein provide an improved approach for implementing control logic for an autonomous vehicle.

BRIEF DESCRIPTION OF THE DRAWINGS

In order that the advantages of the invention will be readily understood, a more particular description of the invention briefly described above will be rendered by reference to specific embodiments illustrated in the appended drawings. Understanding that these drawings depict only typical embodiments of the invention and are not therefore to be considered limiting of its scope, the invention will be described and explained with additional specificity and detail through use of the accompanying drawings, in which.

DETAILED DESCRIPTION

Figure 1:
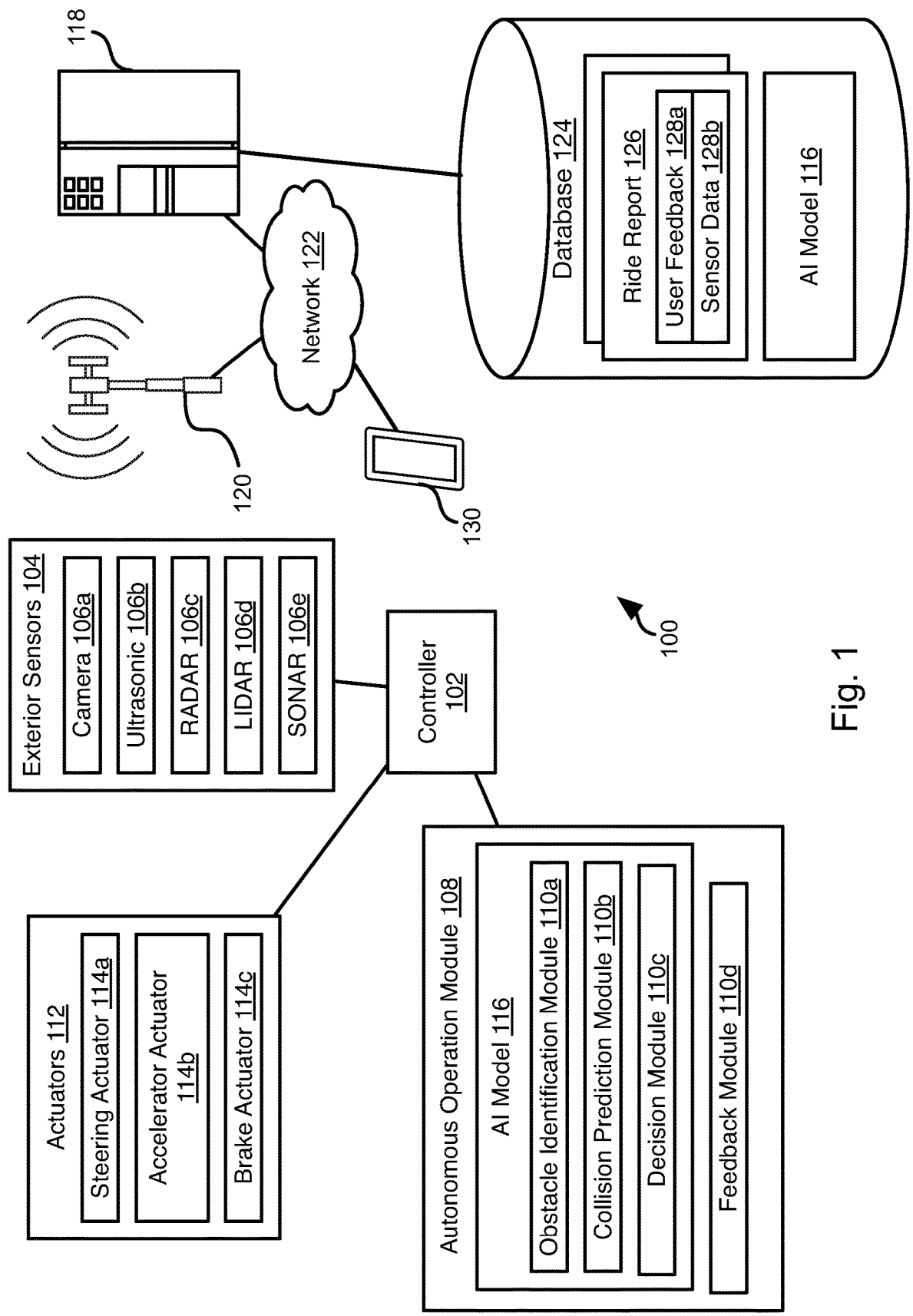
FIG. 1 is a schematic block diagram of components implementing a system in accordance with an embodiment of the present invention.

Referring to FIG. 1, the methods disclosed herein may be performed using the illustrated system 100. As discussed in greater detail herein, a controller 102 may perform autonomous navigation and collision avoidance for a vehicle housing the controller 102. The vehicle may have all of the structures and features of any vehicle known in the art including, wheels, a drive train coupled to the wheels, an engine coupled to the drive train, a steering system, a braking system, and other systems known in the art to be included in a vehicle.

The controller 102 may receive one or more outputs from one or more exterior sensors 104. For example, one or more cameras 106a may be mounted to the vehicle 100 and output image streams to the controller 102. The exterior sensors 104 may include sensors such as an ultrasonic sensor 106b, a RADAR (Radio Detection and Ranging) sensor 106c, a LIDAR (Light Detection and Ranging) sensor 106d, a SONAR (Sound Navigation and Ranging) sensor 106e, and the like.

The controller 102 may execute an autonomous operation module 108 that receives the outputs of the exterior sensors 104. The autonomous operation module 108 may include an obstacle identification module 110a, a collision prediction module 110b, and a decision module 110c. The obstacle identification module 110a analyzes the outputs of the exterior sensors and identifies potential obstacles, including people, animals, vehicles, buildings, curbs, and other objects and structures. In particular, the obstacle identification module 110a may identify vehicle images in the sensor outputs.

The collision prediction module 110b predicts which obstacle images are likely to collide with the vehicle 100 based on its current trajectory or current intended path. The collision prediction module 110b may evaluate the likelihood of collision with objects identified by the obstacle identification module 110a. The decision module 110c may make a decision to stop, accelerate, turn, etc. in order to avoid obstacles. The manner in which the collision prediction module 110b predicts potential collisions and the manner in which the decision module 110c takes action to avoid potential collisions may be according to any method or system known in the art of autonomous vehicles.

The decision module 110c may control the trajectory of the vehicle to navigate to a desired objective while avoiding obstacles. For example, the decision module 110c may activate one or more actuators 112 controlling the direction and speed of the vehicle 100. For example, the actuators 112 may include a steering actuator 114a, an accelerator actuator 114b, and a brake actuator 114c. The configuration of the actuators 114a-114c may be according to any implementation of such actuators known in the art of autonomous vehicles.

In embodiments, the above-described functionality of some or all of the obstacle identification module 110a, collision prediction module 110b, and decision module 110c may be implemented by an artificial intelligence (AI) model 116. The AI model 116 may be a machine learning model such as a deep neural network (DNN), Bayesian machine learning model, or the like. In some embodiments, the deep reinforcement learning algorithm provided by GOOGLE may be used to generate the AI model 116.

The controller 102 may be in data communication with a server system 118. For example, the controller 102 may be in data communication with one or more cellular communication towers 120 that are in data communication with the server system 118 by way of a network 122, such as a local area network (LAN), wide area network (WAN), the Internet, or any other wireless or wired network connection.

The server system 118 may host or access a database 124. The database 124 may store ride reports 126. The ride reports 126 may include user feedback 128a. The feedback 128a may be feedback received from a passenger during or following a ride as described below. For example, the autonomous operation module 108 may include a feedback module 110d through which the passenger provides feedback as described according to the method described below. The ride reports 126 may further include sensor data 128b for each ride, such as some or all of the sensor data for some or all of the exterior sensors 104.

As described herein below, a user may provide feedback by means of a mobile device 130, such as a mobile phone, tablet computer, wearable computer, etc. The functions ascribed herein to the mobile device 130 may also be performed by a desktop or laptop computer or any other type of computing device. In some embodiments, the mobile device 130 may communicate directly with the server 118 or by way of the controller 102 or some other intermediary computing device.

As described in greater detail below, the database 124 may also include a version of the AI model 116. The AI model 116 may be updated by the server system 118 in response to the ride reports 126 as described below. The AI model 116 as updated may be transmitted to the controllers 102 of one or more vehicles to replace previous versions of the AI model 116 accessed by the controllers.

Figure 2:
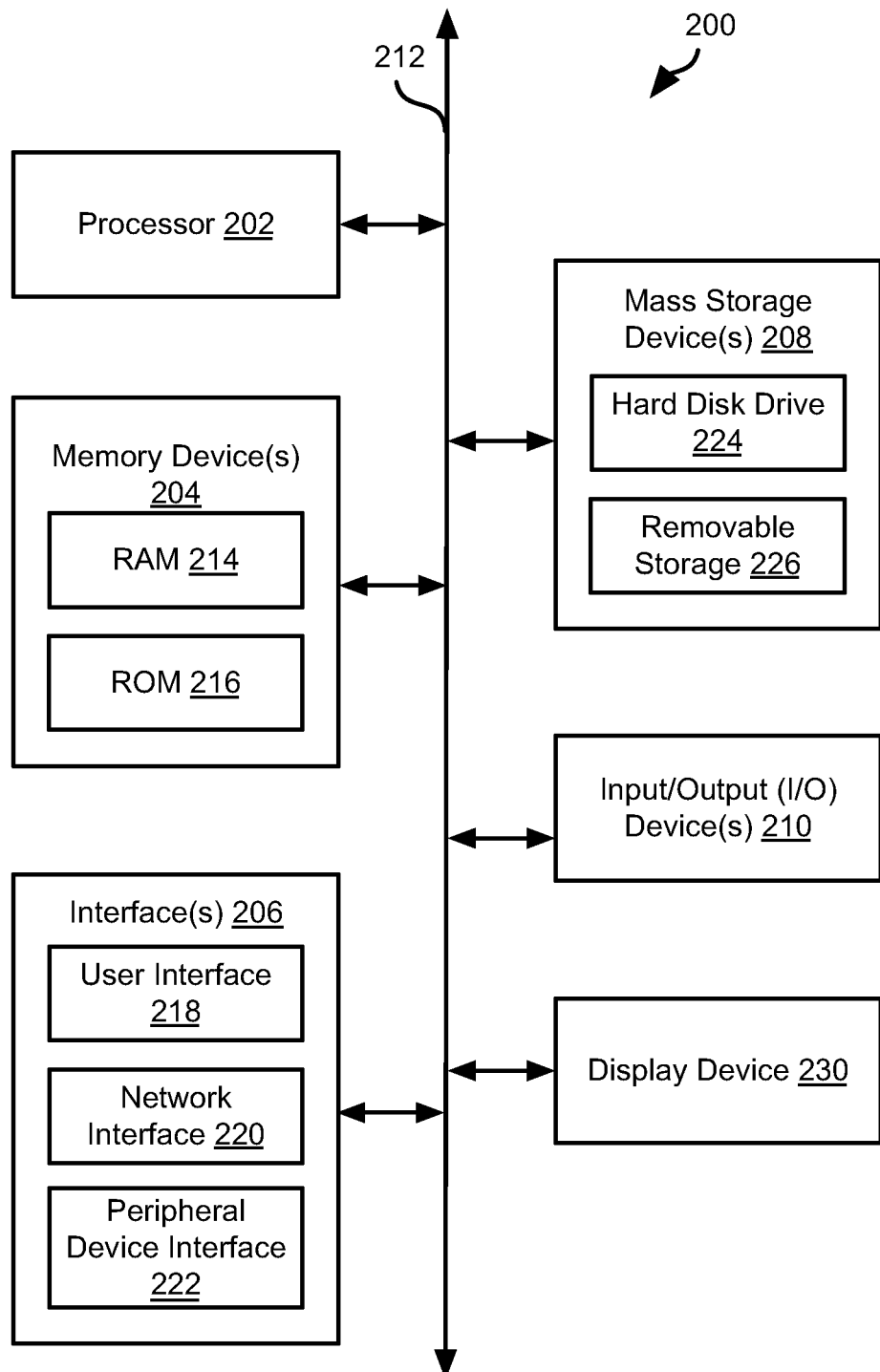
FIG. 2 is a schematic block diagram of an example computing device suitable for implementing methods in accordance with embodiments of the invention.

FIG. 2 is a block diagram illustrating an example computing device 200. Computing device 200 may be used to perform various procedures, such as those discussed herein. The controller 102, server system 118, and mobile device 130 may have some or all of the attributes of the computing device 200.

Computing device 200 includes one or more processor(s) 202, one or more memory device(s) 204, one or more interface(s) 206, one or more mass storage device(s) 208, one or more Input/Output (I/O) device(s) 210, and a display device 230 all of which are coupled to a bus 212. Processor(s) 202 include one or more processors or controllers that execute instructions stored in memory device(s) 204 and/or mass storage device(s) 208. Processor(s) 202 may also include various types of computer-readable media, such as cache memory.

Memory device(s) 204 include various computer-readable media, such as volatile memory (e.g., random access memory (RAM) 214) and/or nonvolatile memory (e.g., read-only memory (ROM) 216). Memory device(s) 204 may also include rewritable ROM, such as Flash memory.

Mass storage device(s) 208 include various computer readable media, such as magnetic tapes, magnetic disks, optical disks, solid-state memory (e.g., Flash memory), and so forth. As shown in FIG. 2, a particular mass storage device is a hard disk drive 224. Various drives may also be included in mass storage device(s) 208 to enable reading from and/or writing to the various computer readable media. Mass storage device(s) 208 include removable media 226 and/or non-removable media.

I/O device(s) 210 include various devices that allow data and/or other information to be input to or retrieved from computing device 200. Example I/O device(s) 210 include cursor control devices, keyboards, keypads, microphones, monitors or other display devices, speakers, printers, network interface cards, modems, lenses, CCDs or other image capture devices, and the like.

Display device 230 includes any type of device capable of displaying information to one or more users of computing device 200. Examples of display device 230 include a monitor, display terminal, video projection device, and the like.

Interface(s) 206 include various interfaces that allow computing device 200 to interact with other systems, devices, or computing environments. Example interface(s) 206 include any number of different network interfaces 220, such as interfaces to local area networks (LANs), wide area networks (WANs), wireless networks, and the Internet. Other interface(s) include user interface 218 and peripheral device interface 222. The interface(s) 206 may also include one or more peripheral interfaces such as interfaces for printers, pointing devices (mice, track pad, etc.), keyboards, and the like.

Bus 212 allows processor(s) 202, memory device(s) 204, interface(s) 206, mass storage device(s) 208, I/O device(s) 210, and display device 230 to communicate with one another, as well as other devices or components coupled to bus 212. Bus 212 represents one or more of several types of bus structures, such as a system bus, PCI bus, IEEE 1394 bus, USB bus, and so forth.

For purposes of illustration, programs and other executable program components are shown herein as discrete blocks, although it is understood that such programs and components may reside at various times in different storage components of computing device 200, and are executed by processor(s) 202. Alternatively, the systems and procedures described herein can be implemented in hardware, or a combination of hardware, software, and/or firmware. For example, one or more application specific integrated circuits (ASICs) can be programmed to carry out one or more of the systems and procedures described herein.

Figure 3:
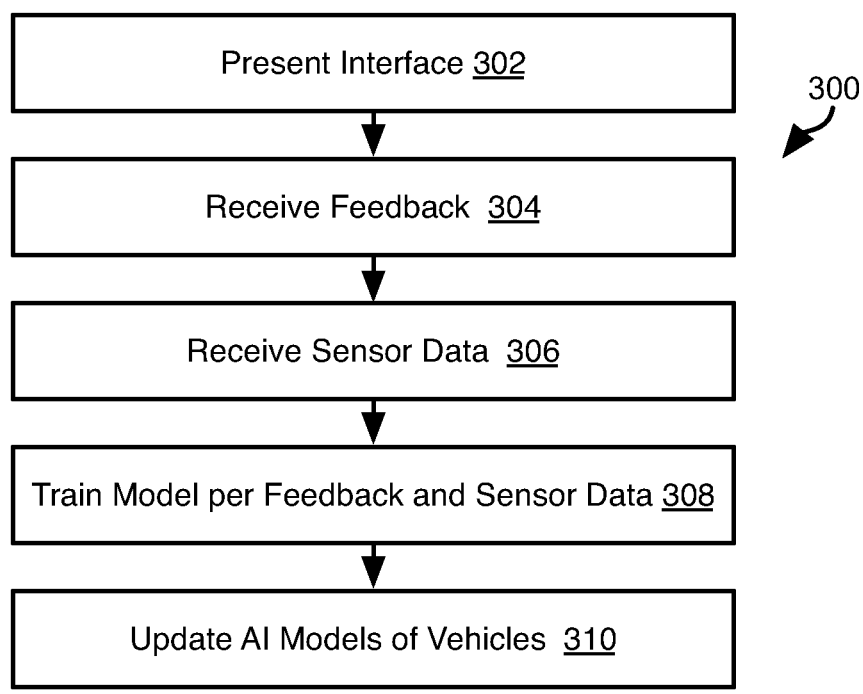
FIG. 3 is a process flow diagram of a method for updating control logic based on passenger feedback in accordance with embodiments of the present invention.

Referring to FIG. 3, the illustrated method 300 may be executed by the server system 118 in cooperating with a mobile device 130 of a passenger and the controller 102 of an autonomous vehicle in which the passenger has traveled or is travelling.

The method 300 may include presenting 302 an interface to the customer on the mobile device 130 for receiving feedback from the passenger about the ride. The data for populating the interface may be transmitted by the server system 118 to the mobile device 130. For example, the controller 102 may transmit data for a ride to the server system 118 or directly to the mobile device 130. The data for the ride may include the route traveled and one or more vehicle signals, such as signals derived from the exterior sensors 104 during the ride.

The controller 102 or server system 118 may further define the interface and provide it to the mobile device 130 for display, such as in the form of a web page. Alternatively, the controller 102 or server system 118 may provide data defining the interface to an application executing on the mobile device 130, which then renders the interface on the mobile device 130.

In yet another embodiment, data for defining the interface is provided by the controller 102 directly to the mobile device 130, such as over a wireless network connection.

Figure 4:
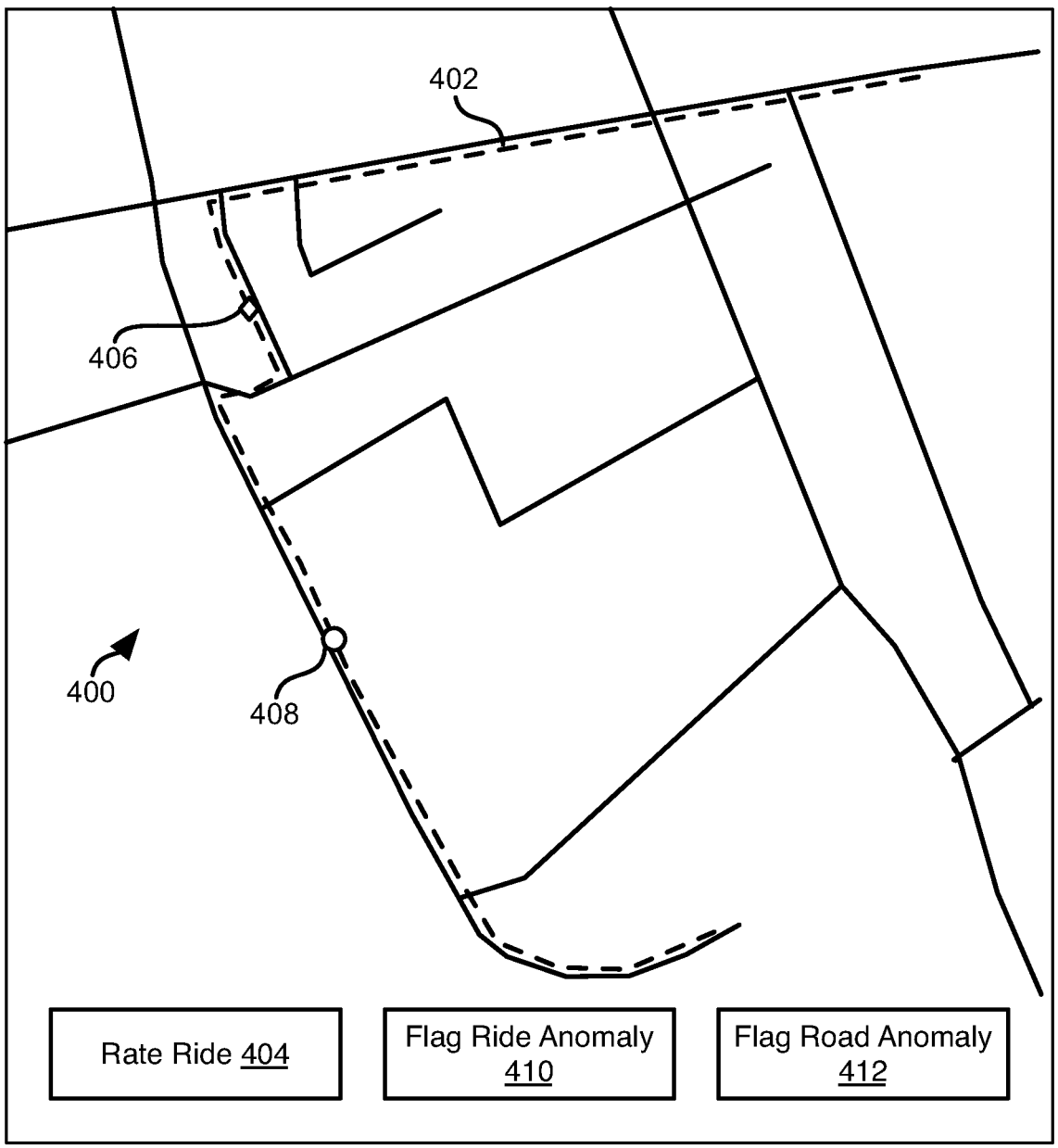
FIG. 4 illustrates an interface for receiving passenger feedback in accordance with an embodiment of the present invention.

FIG. 4 illustrates an example interface. The interface may include a map 400 illustrating streets, landmarks, labels of streets and landmarks, and any other information that may be included in a map as known in the art. The map may be superimposed over a satellite image of the area represented by the map as known in the art.

The interface may include an interface element 404 that a user may select in order to provide a rating of a ride, e.g. a positive or negative rating, a selection of a value form 1 to N, where N indicates no problems and 1 indicates a poor quality ride.

The interface may include a rendering 402 of a path of the vehicle during the ride superimposed on the map. The interface may receive user inputs specifying locations 406, 408 at which anomalies occurred during the ride. In some embodiments, the interface may receive passenger specification of types of anomalies. For example, interface element 410 may enable the passenger to flag a location of a ride anomaly. For example, following selection of interface element 410, a subsequent selection on the path 102 may be interpreted as user specification of a ride anomaly. The interface may further receive a user specification of a type of the ride anomaly, i.e. an autonomous action of the vehicle that the passenger feels was not well executed, such as departure from a lane, a turn that was taken too fast or that deviated from an appropriate path, or the like.

The interface may include an interface element 412 that enables the passenger to specify that a selected point on the path map 400 corresponds to a road anomaly, e.g. a pot hole, shut down lane, road construction, blocked road, accident etc.

Referring again to FIG. 3, the method 300 may include receiving 304, by the server system 118, feedback through the interface presented at step 302, such as some or all of the feedback described above with respect to the interface of FIG. 4. The method 300 further includes receiving 306, by the server system 118, sensor data. This may include receiving, for some or all of the exterior sensors 104, a set of sensor readings throughout the ride by that sensor. Accordingly, step 306 may include receiving some or all of a set images received from one or more cameras 106a, a stream of outputs of the ultrasonic sensor 106 b, RADAR readings from the RADAR 106 c, a set of point clouds from the LIDAR sensor 106 d, and a set of SONAR readings from the SONAR sensor 106 e.

In some embodiments, the GPS (global positioning system) coordinates of the vehicle 100 throughout the ride, e.g. a time point and the GPS coordinate at that time point, may be received from the controller 102 at step 306.

In some embodiments, data received at step 306 may include outputs of the decision module 110c, i.e. actions invoked by the decision module 110c, such as activations of the actuators 112. Data received at step 306 may include data describing the locations and/or relative velocity of obstacles detected by the obstacle identification module 110a during the ride and the locations of predicted collisions identified by the collision prediction module 110b during the ride.

The method 300 may further include training 308 a model according to both of the feedback of step 304 and the sensor data of step 306. For example, the model may be the AI model 116. Various machine learning models enable the model to be repeatedly trained using additional training data. For example, the AI model 116 may be a deep reinforcement learning model, such as that provided by GOOGLE.

In this case, training 308 the model may include using the sensor data as inputs and decisions of the decision module 110c as outputs. In some embodiments, step 308 may include training the model using tens, hundreds, or even thousands of data sets, where each data set includes data from steps 304 and 306 of one ride. Feedback is embodied as an overall rating of the passenger as well as feedback about particular ride anomalies. As known in the art of deep reinforcement learning models, the model may be trained based on this feedback to promote actions that were rated highly by the passenger, i.e. a highly rated and uneventful ride and reduce occurrence of actions that are present in lowly rated rides or flagged as anomalies by the passenger.

In one example, if during a certain section of the ride, the passenger feels that the controller 100 causes the vehicle to take an aggressive turn, the passenger will notify the server system 118 through feedback in the form of ratings, as described above. Feedback may be received from multiple passengers, including multiple passengers passing through the same turn and who provide feedback. If lower ratings are received from multiple passengers around that area, i.e. the server system 118 will train the model 116 using that feedback and the sensor data recorded around that anomaly. With multiple such datasets over a period of time, deep reinforcement learning helps to achieve a solution that maximizes some sort of a cumulative reward. Thus, if the system received various lower ratings for the aforementioned turn, using this method, the model 116 would learn anomalies at the turn and potentially make changes to the control strategies, which in case might mean a more conservative turn or even a different route altogether.

In another example, each ride taken by the passenger can be represented as a sequence of state-action pairs, where the state of the vehicle corresponds to sensor values and the action corresponds to control outputs (e.g. the steering angle). Each batch of new ratings with corresponding state-action sequences can then be used within a deep reinforcement learning scheme such as a Deep-Q Network. As new ratings are accumulated, the network will converge upon a control policy that increases the ratings given by passengers.

Following training, the AI model 116 as trained may then be used to update 310 the controllers 102 of one or more vehicles. For example, by transmitting the updated AI model to the controllers 102 over a network 122 and one or more cellular antennas 120 or by a wired connection to the controller 102. The controllers 102 of these vehicles may then perform obstacle avoidance and autonomous navigation using the updated AI model 116.

In the above disclosure, reference has been made to the accompanying drawings, which form a part hereof, and in which is shown by way of illustration specific implementations in which the disclosure may be practiced. It is understood that other implementations may be utilized and structural changes may be made without departing from the scope of the present disclosure. References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

Implementations of the systems, devices, and methods disclosed herein may comprise or utilize a special purpose or general-purpose computer including computer hardware, such as, for example, one or more processors and system memory, as discussed herein. Implementations within the scope of the present disclosure may also include physical and other computer-readable media for carrying or storing computer-executable instructions and/or data structures. Such computer-readable media can be any available media that can be accessed by a general purpose or special purpose computer system. Computer-readable media that store computer-executable instructions are computer storage media (devices). Computer-readable media that carry computer-executable instructions are transmission media. Thus, by way of example, and not limitation, implementations of the disclosure can comprise at least two distinctly different kinds of computer-readable media: computer storage media (devices) and transmission media.

Computer storage media (devices) includes RAM, ROM, EEPROM, CD-ROM, solid state drives ("SSDs") (e.g., based on RAM), Flash memory, phase-change memory ("PCM"), other types of memory, other optical disk storage, magnetic disk storage or other magnetic storage devices, or any other medium which can be used to store desired program code means in the form of computer-executable instructions or data structures and which can be accessed by a general purpose or special purpose computer.

An implementation of the devices, systems, and methods disclosed herein may communicate over a computer network. A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links, which can be used to carry desired program code means in the form of computer-executable instructions or data structures and which can be accessed by a general purpose or special purpose computer. Combinations of the above should also be included within the scope of computer-readable media.

Computer-executable instructions comprise, for example, instructions and data which, when executed at a processor, cause a general purpose computer, special purpose computer, or special purpose processing device to perform a certain function or group of functions. The computer executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the disclosure may be practiced in network computing environments with many types of computer system configurations, including, an in-dash vehicle computer, personal computers, desktop computers, laptop computers, message processors, hand-held devices, multi-processor systems, microprocessor-based or programmable consumer electronics, network PCs, minicomputers, mainframe computers, mobile telephones, PDAs, tablets, pagers, routers, switches, various storage devices, and the like. The disclosure may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Further, where appropriate, functions described herein can be performed in one or more of: hardware, software, firmware, digital components, or analog components. For example, one or more application specific integrated circuits (ASICs) can be programmed to carry out one or more of the systems and procedures described herein. Certain terms are used throughout the description and claims to refer to particular system components. As one skilled in the art will appreciate, components may be referred to by different names. This document does not intend to distinguish between components that differ in name, but not function.

It should be noted that the sensor embodiments discussed above may comprise computer hardware, software, firmware, or any combination thereof to perform at least a portion of their functions. For example, a sensor may include computer code configured to be executed in one or more processors, and may include hardware logic/electrical circuitry controlled by the computer code. These example devices are provided herein purposes of illustration, and are not intended to be limiting. Embodiments of the present disclosure may be implemented in further types of devices, as would be known to persons skilled in the relevant art(s).

At least some embodiments of the disclosure have been directed to computer program products comprising such logic (e.g., in the form of software) stored on any computer useable medium. Such software, when executed in one or more data processing devices, causes a device to operate as described herein.

While various embodiments of the present disclosure have been described above, it should be understood that they have been presented by way of example only, and not limitation. It will be apparent to persons skilled in the relevant art that various changes in form and detail can be made therein without departing from the spirit and scope of the disclosure. Thus, the breadth and scope of the present disclosure should not be limited by any of the above-described exemplary embodiments, but should be defined only in accordance with the following claims and their equivalents. The foregoing description has been presented for the purposes of illustration and description. It is not intended to be exhaustive or to limit the disclosure to the precise form disclosed. Many modifications and variations are possible in light of the above teaching. Further, it should be noted that any or all of the aforementioned alternate implementations may be used in any combination desired to form additional hybrid implementations of the disclosure.

The invention claimed is:

1. A method comprising, by a computer system:
receiving a first input from a first passenger of an autonomous vehicle, the first input including first feedback relating to a first portion of a first trip performed by the autonomous vehicle with the first passenger;
receiving a second input from a second passenger of an autonomous vehicle, the second input including second feedback relating to a first portion of a second trip performed by the autonomous vehicle with the second passenger, wherein the first portion of the first trip and the first portion of the second trip include a same location;
receiving sensor data from the autonomous vehicle relating to the first portion of the trip; and
updating an artificial intelligence (AI) model used by the autonomous vehicle for navigation based on the first feedback, the second feedback, and the sensor data.

2. The method of claim 1, wherein updating the artificial intelligence (AI) model comprises updating the AI model using a deep reinforcement learning algorithm.

3. The method of claim 1, wherein the first input includes a report of a driving anomaly.

4. The method of claim 1, wherein the first input includes a report of a lane deviation.

5. The method of claim 1, wherein the first input includes a report of a deviation during a turn.

6. The method of claim 1, wherein receiving the first input comprises receiving the first input from a mobile device of the passenger.

7. The method of claim 6, wherein receiving the first input comprises receiving a user selection of one or more locations on a map displayed on the mobile device and an indication that the one or more locations correspond to at least one of a road anomaly and a driving anomaly.

8. The method of claim 1, wherein the sensor data includes outputs of at least one of a light detection and ranging (LIDAR) sensor, a radio detection and ranging (RADAR) sensor, and one or more cameras.

9. The method of claim 1, further comprising:
receiving, by a controller of the autonomous vehicle, outputs of one or more sensors; and
autonomously driving, by the controller, the autonomous vehicle using the outputs processed according to the artificial intelligence (AI) model.

10. A system comprising one or more processing devices and one or more memory devices operably coupled to the one or more processing devices, the one or more memory devices storing executable code effective to cause the one or more processing devices to:
- receive a first input from a first passenger of an autonomous vehicle, the first input including first feedback relating to a first portion of a first trip performed by the autonomous vehicle with the first passenger;
- receive a second input from a second passenger of an autonomous vehicle, the second input including second feedback relating to a first portion of a second trip performed by the autonomous vehicle with the second passenger, wherein the first portion of the first trip and the first portion of the second trip include a same location;
- receive sensor data from the autonomous vehicle relating to the first portion of the trip; and
- update an artificial intelligence (AI) model used by the autonomous vehicle for navigation based on the first feedback, the second feedback, and the sensor data.

11. The system of claim 10, wherein the executable code is further effective to cause the one or more processing devices to update the artificial intelligence (AI) model by updating the AI model using a deep reinforcement learning algorithm.

12. The system of claim 10, wherein the first input includes a report of a driving anomaly.

13. The system of claim 10, wherein the first input includes a report of a lane deviation.

14. The system of claim 10, wherein the first input includes a report of deviation during a turn.

15. The system of claim 10, wherein the executable code is further effective to cause the one or more processing devices to receive the first input by receiving the first input from a mobile device of the passenger.

16. The system of claim 15, wherein the executable code is further effective to cause the one or more processing devices to receive the first input by receiving a user selection of one or more locations on a map displayed on the mobile device and an indication that the one or more locations correspond to at least one of a road anomaly and a driving anomaly.

17. The system of claim 10, wherein the sensor data includes outputs of at least one of a light detection and ranging (LIDAR) sensor, a radio detection and ranging (RADAR) sensor, and one or more cameras.

18. The system of claim 10, further comprising the autonomous vehicle comprising a controller, the controller being programmed to:
- receive outputs of one or more sensors; and
- autonomously drive the autonomous vehicle using the outputs processed according to the artificial intelligence (AI) model.

19. The method of claim 1, wherein the first feedback and the second feedback indicate a negative experience in the first trip and second trip associated with the first portion, wherein the negative experience includes an action taken by the autonomous vehicle at the first portion or an external condition at the first portion.

20. The method of claim 19, wherein updating an artificial intelligence (AI) model further includes reinforcing the AI model to avoid the action taken by the autonomous vehicle at the first portion.

* * * * *